(12) United States Patent
Carlson et al.

(10) Patent No.: US 11,327,759 B2
(45) Date of Patent: May 10, 2022

(54) MANAGING LOW-LEVEL INSTRUCTIONS AND CORE INTERACTIONS IN MULTI-CORE PROCESSORS

(71) Applicant: Marvell International Ltd., Hamilton (BM)

(72) Inventors: David Albert Carlson, Haslet, TX (US); Shubhendu Sekhar Mukherjee, Southborough, MA (US); Michael Bertone, Marlborough, MA (US); David Asher, Sutton, MA (US); Daniel Dever, North Brookfield, MA (US); Bradley D. Dobbie, Medford, MA (US); Thomas Hummel, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 352 days.

(21) Appl. No.: 16/140,936

(22) Filed: Sep. 25, 2018

(65) Prior Publication Data
US 2020/0097292 A1    Mar. 26, 2020

(51) Int. Cl.
*G06F 7/38*    (2006.01)
*G06F 9/00*    (2006.01)
(Continued)

(52) U.S. Cl.
CPC ........ *G06F 9/30181* (2013.01); *G06F 9/3867* (2013.01); *G06F 12/1063* (2013.01); *G06F 2212/301* (2013.01)

(58) Field of Classification Search
CPC . G06F 9/30181; G06F 9/3867; G06F 12/1063
(Continued)

(56) References Cited

U.S. PATENT DOCUMENTS 5,005,118 A    4/1991  Lenoski
5,437,017 A *  7/1995  Moore ................ G06F 12/1027
                                                 709/213
(Continued)

OTHER PUBLICATIONS

Gerofi, Balazs, Shimada, Akio, Hori, Atsushi, Masamichi, Takagi, Ishikawa, Yutaka, CMCP: A Novel Page Replacement Policy for System Level Hierarchical Memory Management on Many-cores, HPDC '14, Jun. 23-27, 2014, Vancouver, BC, Canada, pp. 73-84.

*Primary Examiner* — Chun Kuan Lee
(74) *Attorney, Agent, or Firm* — Young Basile Hanlon & MacFarlane, P.C.

(57) ABSTRACT

Managing the messages associated with memory pages stored in a main memory includes: receiving a message from outside the pipeline, and providing at least one low-level instruction to the pipeline for performing an operation indicated by the received message. Executing instructions in the pipeline includes: executing a series of low-level instructions in the pipeline, where the series of low-level instructions includes a first (second) set of low-level instructions converted from a first (second) high-level instruction. The second high-level instruction occurs after the first high-level instruction within a series of high-level instructions, and delaying insertion of the low-level instruction provided for performing the operation into an insertion position within the series of low-level instructions, where the delaying causes the insertion position to be between a final low-level instruction converted from the first high-level instruction and an initial low-level instruction converted from the second high-level instruction.

24 Claims, 3 Drawing Sheets

(51) Int. Cl.
*G06F 9/44* (2018.01)
*G06F 9/30* (2018.01)
*G06F 12/1045* (2016.01)
*G06F 9/38* (2018.01)

(58) Field of Classification Search
USPC ............................................ 712/220
See application file for complete search history.

(56) References Cited

U.S. PATENT DOCUMENTS

| | | | |
|---|---|---|---|
| 5,687,338 | A | 11/1997 | Boggs et al. |
| 6,119,204 | A | 9/2000 | Chang |
| 6,308,257 | B1 | 10/2001 | Theogarajan et al. |
| 7,073,043 | B2 | 7/2006 | Arimilli et al. |
| 7,668,979 | B1 | 2/2010 | Wentzlaff |
| 8,412,888 | B2 | 4/2013 | Guthrie et al. |
| 8,412,911 | B2 | 4/2013 | Grohoski et al. |
| 2003/0095557 | A1 | 5/2003 | Keller et al. |
| 2004/0215897 | A1 | 10/2004 | Arimilli et al. |
| 2004/0215898 | A1* | 10/2004 | Arimilli .............. G06F 12/1027 711/144 |
| 2007/0180156 | A1 | 8/2007 | Irish et al. |
| 2008/0107106 | A1 | 5/2008 | Leonard et al. |
| 2009/0046727 | A1 | 2/2009 | Towles |
| 2011/0093644 | A1 | 4/2011 | Kruger et al. |
| 2012/0137079 | A1 | 5/2012 | Ueda |
| 2015/0134931 | A1 | 5/2015 | Mukherjee et al. |
| 2016/0110542 | A1* | 4/2016 | Shanbhogue ....... G06F 9/30076 726/23 |
| 2016/0140043 | A1* | 5/2016 | Mukherjee .......... G06F 12/0808 711/123 |
| 2016/0140047 | A1 | 5/2016 | Mukherjee |
| 2016/0140060 | A1 | 5/2016 | Mukherjee et al. |
| 2016/0140061 | A1 | 5/2016 | Mukherjee et al. |
| 2017/0177493 | A1 | 6/2017 | Guthrie et al. |
| 2017/0286315 | A1 | 10/2017 | Mukherjee et al. |
| 2018/0246724 | A1* | 8/2018 | Fowler ................. G06F 9/3851 |

* cited by examiner

MANAGING LOW-LEVEL INSTRUCTIONS AND CORE INTERACTIONS IN MULTI-CORE PROCESSORS

BACKGROUND

The invention relates to managing low-level instructions and core interactions in multi-core processors.

Many modern processors support hierarchical cache systems with multiple levels of cache, including one or more levels within a processor, or within a processor core (or simply "core") of a multi-core processor, starting with a level one (L1) cache, and one or more levels external to the processor or cores, up to a last level cache (LLC) that is accessed just before main memory is accessed. At each level of the hierarchy, the cache stores copies of a subset of data for a data cache, or instructions, for an instruction cache, to speed access to the data or instructions by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data or instructions into entries and evict blocks of data or instructions from entries in units of memory blocks (also called "cache lines" or "cache blocks"). Each memory block includes a number of words of data or instructions, each word consisting of a predetermined number of bytes. A memory page typically has data or instructions from many memory blocks.

Modern processors also support virtual memory, which allows program instructions being executed by a CPU to refer to virtual addresses within a virtual address space that is larger than a physical address space that is defined by the size of main memory. Virtual memory involves address translation from one or more such virtual address spaces into a physical address space. The translation is performed using a page table that stores mappings between virtual addresses and physical addresses (also called "translations") at a granularity of memory pages (or simply "pages"). The lowest order bits of the virtual address and physical address, called the "page offset," are typically identical, such that data occurring at a particular location in a virtual page occurs at the same relative location in a corresponding physical page. Copies of these translations can be stored within a processor or core, in storage circuitry called a translation lookaside buffer (TLB), which acts as a cache for translations.

SUMMARY

In one aspect, in general, an integrated circuit comprises: at least one processor executing instructions in a pipeline, where a plurality of the instructions are high-level instructions associated with a high-level instruction set, and a plurality of the high-level instructions are each converted into multiple low-level instructions associated with a low-level instruction set; and control circuitry configured to manage messages associated with memory pages stored in a main memory. The managing includes: receiving a message from outside the pipeline, and providing at least one low-level instruction to the pipeline for performing an operation indicated by the received message. Executing instructions in the pipeline includes: executing a series of low-level instructions in the pipeline, where the series of low-level instructions includes a first set of low-level instructions converted from a first high-level instruction and a second set of low-level instructions converted from a second high-level instruction, and the second high-level instruction occurs after the first high-level instruction within a series of high-level instructions, and delaying insertion of the low-level instruction provided for performing the operation into an insertion position within the series of low-level instructions, where the delaying causes the insertion position to be between a final low-level instruction converted from the first high-level instruction and an initial low-level instruction converted from the second high-level instruction.

In another aspect, in general, a method comprises: executing instructions in a pipeline of a processor, where a plurality of the instructions are high-level instructions associated with a high-level instruction set, and a plurality of the high-level instructions are each converted into multiple low-level instructions associated with a low-level instruction set; and managing, using control circuitry, messages associated with memory pages stored in a main memory. The managing includes: receiving a message from outside the pipeline, and providing at least one low-level instruction to the pipeline for performing an operation indicated by the received message. Executing instructions in the pipeline includes: executing a series of low-level instructions in the pipeline, where the series of low-level instructions includes a first set of low-level instructions converted from a first high-level instruction and a second set of low-level instructions converted from a second high-level instruction, and the second high-level instruction occurs after the first high-level instruction within a series of high-level instructions, and delaying insertion of the low-level instruction provided for performing the operation into an insertion position within the series of low-level instructions, where the delaying causes the insertion position to be between a final low-level instruction converted from the first high-level instruction and an initial low-level instruction converted from the second high-level instruction.

Aspects can include one or more of the following features.

The first high-level instruction is an atomic instruction.

At least one low-level instruction in the first set of low-level instructions is associated with a potential side-effect on an architectural state of the processor.

The second high-level instruction occurs immediately after the first high-level instruction within the series of high-level instructions.

The control circuitry is configured to manage: messages associated with at least one translation lookaside buffer that stores copies of translations between virtual addresses and physical addresses of memory pages stored in the main memory, and messages associated with at least one cache module that stores copies of memory blocks located on memory pages stored in the main memory.

The integrated circuit comprises a plurality of processors, and the cache module is shared among two or more of the plurality of processors.

The control circuitry is coupled to a message buffer for storing messages to be sent over interconnection circuitry that interconnects the plurality of processors, and the message buffer is used for storing messages for managing the translation lookaside buffer and is used for storing messages for accessing the cache module.

The control circuitry configures the message buffer to provide a plurality of virtual channels that enable messages associated with a first virtual channel from blocking messages associated with a second virtual channel different from the first virtual channel.

The messages associated with the first virtual channel include messages associated with managing the translation lookaside buffer, and the messages associated with the second virtual channel include messages associated with accessing the cache module.

The messages associated with managing the translation lookaside buffer include translation lookaside buffer invalidation messages for invalidating one or more entries in the translation lookaside buffer.

Aspects can have one or more of the following advantages.

The techniques described herein ensure correct operation of the integrated circuit and its processor cores, including maintenance of coherence of information stored in caches and TLBs across multiple cores, while avoiding potential errors in operation associated with converting high-level instructions to low-level instructions. To aid in maintaining such coherence, an instruction set architecture may provide different types of invalidation instructions that are broadcast among the cores to ensure an entry in a cache or TLB consistently removed or marked as being invalid for all the cores (or those cores in the same coherence domain). An instruction cache invalidate (ICI) instruction can be used to invalidate entries in instruction caches, and a TLB invalidate (TLBI) instruction can be used to invalidate entries in a TLBs.

In the case of managing coherence among TLBs, when a translation is changed, in addition to updating the page table, any copy of the old translation that may be stored in a TLB of a core needs to be invalidated. In that scenario, a TLBI instruction may then be broadcast to each core, specifying (explicitly or implicitly) one or more translations to be invalidated. Some TLBI instructions invalidate translations for virtual addresses implicitly (e.g., based on context information, such as an exception level, or other information) without specifying a particular virtual address, and some TLBI instructions, called "address-based" TLBI instructions, invalidate translations for virtual addresses by explicitly indicating an actual address (for a particular memory page) whose translation is now invalid.

When a particular core issues such an invalidation instruction, the invalidation instruction is performed at that particular (local) core and is also broadcast to all other (remote) cores in the processor, or all remote cores within a socket or possibly within multiple sockets. There is not necessarily any particular ordering required between an incoming invalidation instruction received at a remote core and sequence of instructions already being executed within the remote core. However, the local core that initiated a set of one or more invalidation instructions (e.g., a combination of TLBI and ICI instructions) is able to issue a data synchronization barrier (DSB) instruction after the set of invalidation instructions to ensure that the effect of those invalidation instructions have been globally observed (i.e., have taken effect at all cores in the processor). That way, any instructions that appear in program order after the DSB instruction access correct values within any instruction cache or TLB.

The techniques described herein ensure that invalidation instructions can be introduced into each of the remote cores' pipelines in a manner that avoids certain potential architectural state errors that could occur in situations in which the instructions being executed in a core's pipeline include high-level instructions, associated with a high-level instruction set architecture, which are each converted into multiple low-level instructions associated with a low-level instruction set architecture, as described in more detail below. The techniques also manage buffer space for communicating among the cores in a manner that avoids certain potential deadlock situations.

Other features and advantages of the invention will become apparent from the following description, and from the claims.

DESCRIPTION

Figure 1:
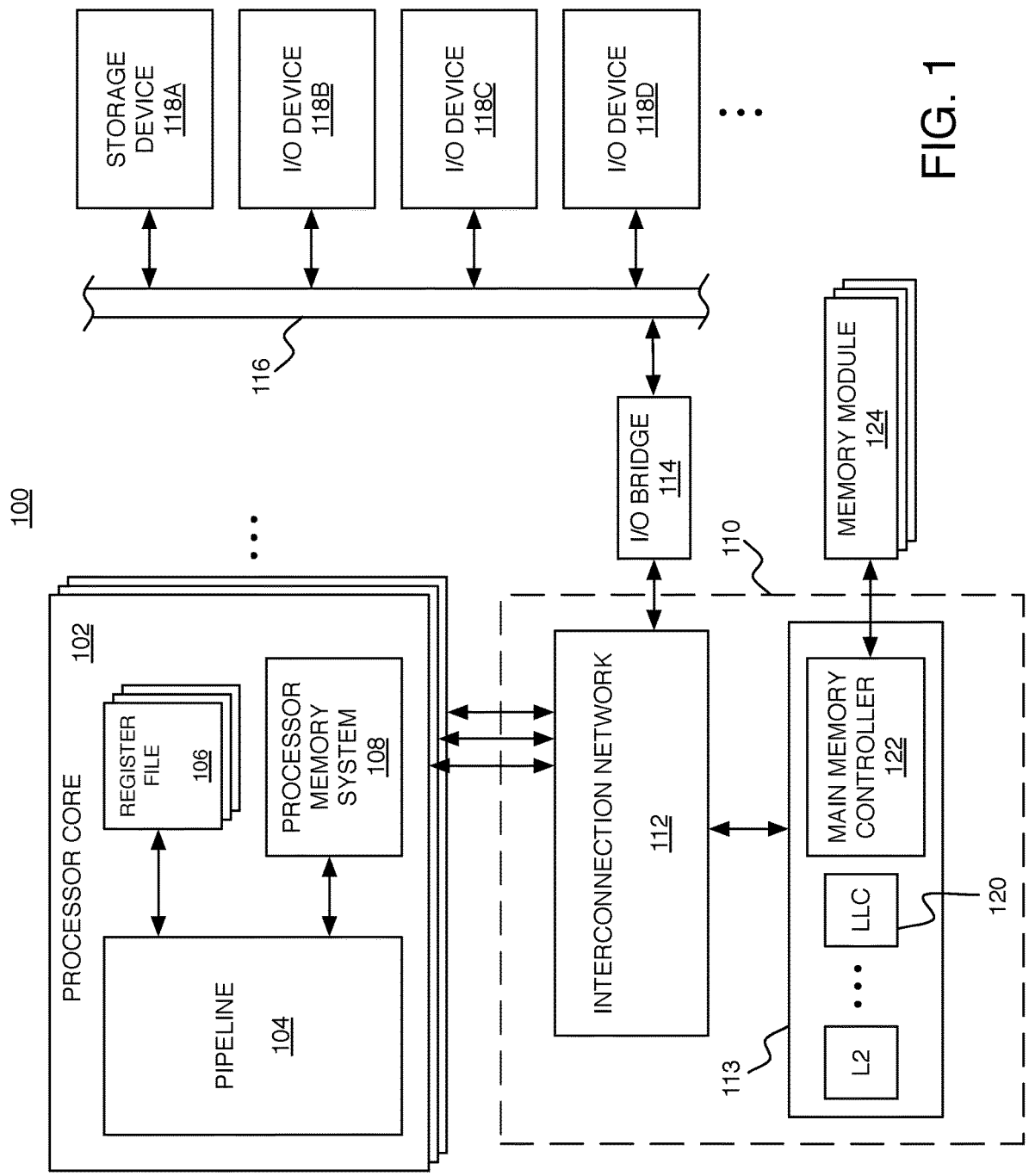
FIG. 1 is a schematic diagram of a computing system.

FIG. 1 shows an example of a computing system 100 in which the techniques described herein can be used. The computing system 100 includes processor cores 102 of a multi-core architecture, where each processor core 102 (or each "core") comprises an individual central processing unit (CPU) with associated circuitry. In this example, each processor core 102 includes a pipeline 104, one or more register files 106, and a processor memory system 108. Each processor core 102 is connected to an uncore 110, which includes an interconnection network 112 (e.g., bus, cross-bar switch, mesh network, etc.) and an external memory system 113. The interconnection network 112 enables communication with the external memory system 113 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 113 together form a hierarchical memory system including at least a first level (L1) cache within the processor memory system 108, and any number of higher level (L2, L3, . . . ) caches within the external memory system 113. At each level, the cache can include a module that provides an instruction cache for caching instructions, and separate module that provides a data cache for caching data. In addition to an L1 instruction cache and data cache, the processor memory system 108 includes a TLB, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104.

The highest level cache within the external memory system 113 (which may be the L2 cache if there are only two levels in the hierarchy) is the LLC 120, which is accessed just before main memory. Of course, this is only an example. The exact division between which level caches are within the processor memory system 108 and which are in the external memory system 113 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. For the purposes of some of the examples described herein, the system 100 will be assumed to have an L1 cache within each processor core 102 and the L2 cache and higher levels within the external memory system 113. The external memory system 113 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 104 includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, storing or loading to or from a memory address for a memory instruction, or may involve evaluating a condition of a conditional branch instruction to determine whether or not the branch will be taken. Finally, an instruction is committed, which may involve storing a result (e.g., in a write back (WB) stage or stages). Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time).

Figure 2:
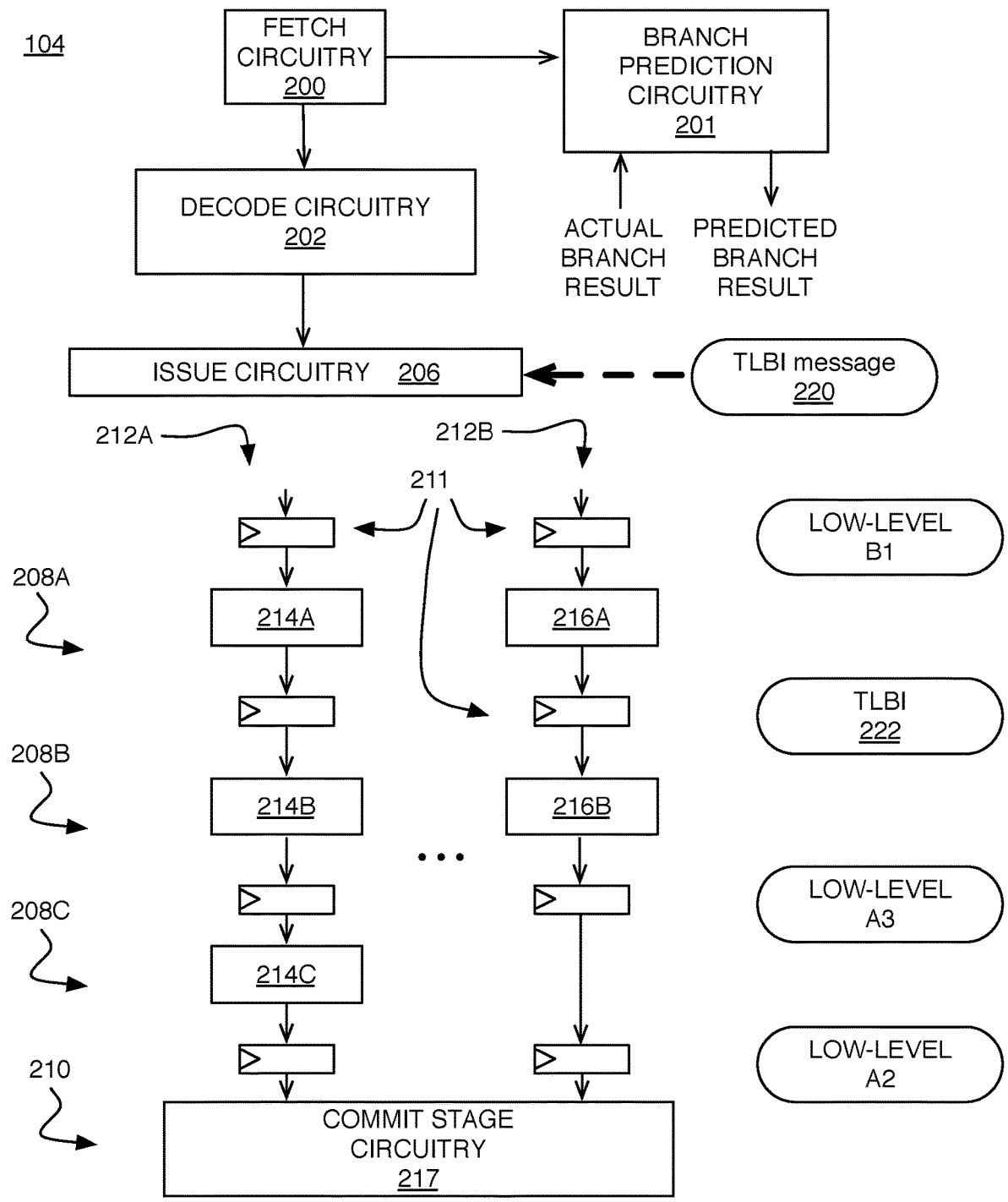
FIG. 2 is a schematic diagram of a processor core pipeline.

FIG. 2 shows an example in which the pipeline 104 is configured to receive external messages, such as TLBI instruction messages, and insert low-level instructions for performing corresponding operations into the pipeline in a manner that avoids potential errors, as will be described in more detail below. The pipeline 104 includes circuitry for the various stages. For one or more instruction fetch stages, instruction fetch circuitry 200 provides a PC to an instruction cache in the processor memory system 108 to fetch instructions to be fed into the pipeline 104. For example, the PC can be a virtual address of the next instruction, in which case the PC can be incremented by the length of a virtual address in the case of sequential execution (i.e., without taking any branches). The fetch circuitry 200 also provides the program counter to branch prediction circuitry 201, which is used to provide a predicted branch result for branch instructions. The branch prediction circuitry 201 also stores branch history information that is updated based on a received actual branch result. In some implementations, some or all of the branch prediction circuitry 201 is considered part of the fetch circuitry 200.

For one or more instruction decode stages, instruction decode circuitry 202 stores decoded instructions in buffers until they are ready to be issued. The instructions fetched may conform to a high-level instruction set architecture (e.g., ARM® instructions), and the decode circuitry 202 can be configured to convert some or all high-level instructions into multiple low-level instructions (also called "micro-instructions" or "micro-operations") that conform to a low-level instruction set architecture that is native to the hardware design of the computing system 100. The low-level instructions can then make their way through the remaining stages of the pipeline 104. While high-level instructions may be re-ordered, typically, a set of low-level instructions that have been converted from the same high-level instruction proceed through the pipeline 104 in order and without interleaving low-level instructions from different high-level instructions. So, there is a well-defined boundary between a set of low-level instructions A1, A2, A3 converted from a high-level instruction A, and a subsequent set of low-level instructions B1, B2, B3 converted from a high-level instruction B. In particular, when instruction B is issued immediately after instruction A, the corresponding low-level instructions will issue in the order: A1, A2, A3, B1, B2, B3, with a "high-level instruction boundary" occurring between low-level instructions A3 and B1. As described in more detail below, this high-level instruction boundary is a location where a low-level instruction based on an external message can be inserted.

The preceding example of three low-level instructions for a given high-level instructions is just one example. In some cases, different high-level instructions will be converted in to a different number of low-level instructions, or some high-level instructions may be essentially preserved without requiring explicit conversion to be executed as a low-level instruction (e.g., if the same instruction exists in both high-level and low-level instruction set architectures). Also, in other examples, some or all of the conversion from high-level instructions to low-level instructions can be performed before or after the instruction decode stage(s).

Issue circuitry 206 determines in which cycle each of the low-level instructions in the decode circuitry buffers are to be issued, which makes them available to progress through circuitry of the execution stages 208A, 208B, and 208C of the pipeline 104. (For simplicity, this example has three execution stages, but other examples may have more or fewer execution stages.) There is also at least one commit stage 210 that commits results of instructions that have made their way through the execution stages 208A, 208B, and 208C. For example, commit stage circuitry 217 may write back a result into a register file 106 (FIG. 1).

The "instruction window" refers to instructions that have not yet issued (e.g., instructions in the decode circuitry buffers), and instructions that have been issued but are still in progress through later stages of the pipeline 104 and have not yet been committed. As instructions are issued, more instructions enter the instruction window by being stored in the decode circuitry buffers. Instructions leave the instruction window as they are committed, but not necessarily in one-to-one correspondence with instructions that enter the instruction window. Therefore, the size of the instruction window may vary. Instructions enter the instruction window in-order (i.e., according to a program order), and leave the instruction window in-order. But, in some implementations instructions may be issued and/or executed out-of-order.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include units for various operations (e.g., ALU, multiplier, floating point unit), and another path may include circuitry for performing memory access instructions, including load instructions that read data values from the memory system, and store instructions to write data values to the memory system. This circuitry also performs translation of virtual addresses to physical addresses when necessary, and management of the TLB within the processor memory system 108.

One aspect of managing the TLB includes handling TLBI instructions at each remote processor core that have been broadcast from a local processor core. In doing so, there are two potential errors in operation that can be avoided by appropriately configuring circuitry within the computing system 100. Each of these potential errors in operation, and the manner in which they are avoided, is described below.

A first potential error is associated with insertion of low-level instructions based on messages received from outside a processor core (or "external messages") into a stream of low-level instructions executing within that processor core. The potential error, examples of which are described below, can be avoided by configuring the issue circuitry 206 to perform a "clean insertion" of a low-level instruction (e.g., a TLBI instruction based on a received TLBI instruction message) into a high-level instruction boundary within the low-level instruction stream. An example of such clean insertion is illustrated in FIG. 2, which shows a TLBI instruction message 220 being received for handling by the issue circuitry 206. The issue circuitry 206 extracts a TLBI instruction 222 from the message 220 and delays insertion of the TLBI instruction 222 into an insertion position within the series of low-level instructions that is between the last low-level instruction A3 of the previous high-level instruction A and the first low-level instruction B1 of the next high-level instruction B.

In the following first example of a potential error in updating an architectural state that could arise if the issue circuitry 206 is not configured to perform clean insertion, a TLBI instruction is inserted between two low-level instructions that are part of the same high-level instruction. In this example, a first low-level instruction C1 architecturally commits a value that can have a side-effect and cannot be rolled back, and the second low-level instruction C2 attempts to access a particular address. But, a TLBI instruction CX, generated from an external TLBI instruction message, is inserted between C1 and C2 address. The invalidation of a particular translation is assumed to cause C2 to result in a page fault (i.e., attempting to access a virtual memory page not currently loaded, or marked as being loaded, in a physical memory page within main memory). In response to the page fault, the processor core 102 will raise an exception, causing a software exception handler to restart the issuing of instructions in the pipeline 104 from the first low-level instruction C1. But, the resulting second execution of instruction C1 causes a redundant update of architectural state, which can cause incorrect operation. Thus, to safely insert a TLBI instruction (or other instruction for performing an operation in response to an external message) into the pipeline 104, it should be a clean instruction performed at a boundary between high-level instructions.

In the following second example of a potential error in updating an architectural state that could arise if the issue circuitry 206 is not configured to perform clean insertion, a TLBI instruction is inserted between two low-level instructions that are part of the same high-level instruction. In this example, the two low-level instructions C1 and C2 correspond to a high-level instruction C that is an atomic instruction. An atomic instruction is one that performs an operation atomically, such that the operation is either performed or not performed in its entirety. So, if that operation is composed of sub-steps, either all of the sub-steps are successfully performed, or none of the sub-steps are performed (or at least the ending architectural state is the same as it would be if none of the sub-steps were performed). If part of the steps to be performed atomically access an address whose translation could potentially be invalidated, then there is potential for an error in architectural state without clean insertion. For example, the instruction C1 may perform a load operation that is part of a lock acquisition attempt, and the instruction C2 may perform a store operation that depends on a value loaded by the load operation to complete the lock acquisition attempt. Or, the instruction C1 may result in information being written into a miss address file, which is to be handled by the instruction C2. But, without clean insertion, a TLBI instruction could be inserted between instructions C1 and C2, and that TLBI instruction could invalidate the address accessed by instruction C1. Then, an attempt by instruction C2 to access a now invalid address may take a fault that triggers an exception to be handled by software. Since software handlers are programmed in terms of hi-level instructions, the handler restarts the high-level instructions from instruction C, which causes first low-level instruction C1 to be repeated. This situation may result in an error in architectural state (e.g., information in a miss address file that is not properly handled, or an incorrect result of a lock acquisition attempt).

A second potential error is associated with TLBIs that are broadcast to remote processor cores competing for resources within, or associated with, the interconnection network 112, which could result in a deadlock situation. One example of such resources is buffer space within control circuitry connected to the interconnection network 112. While sharing resources such as buffer space can be advantageous in terms of efficient use of the limited area of an integrated circuit, the circuitry should be configured to ensure competition for those shared resources does not cause problems, such as deadlock.

Figure 3:
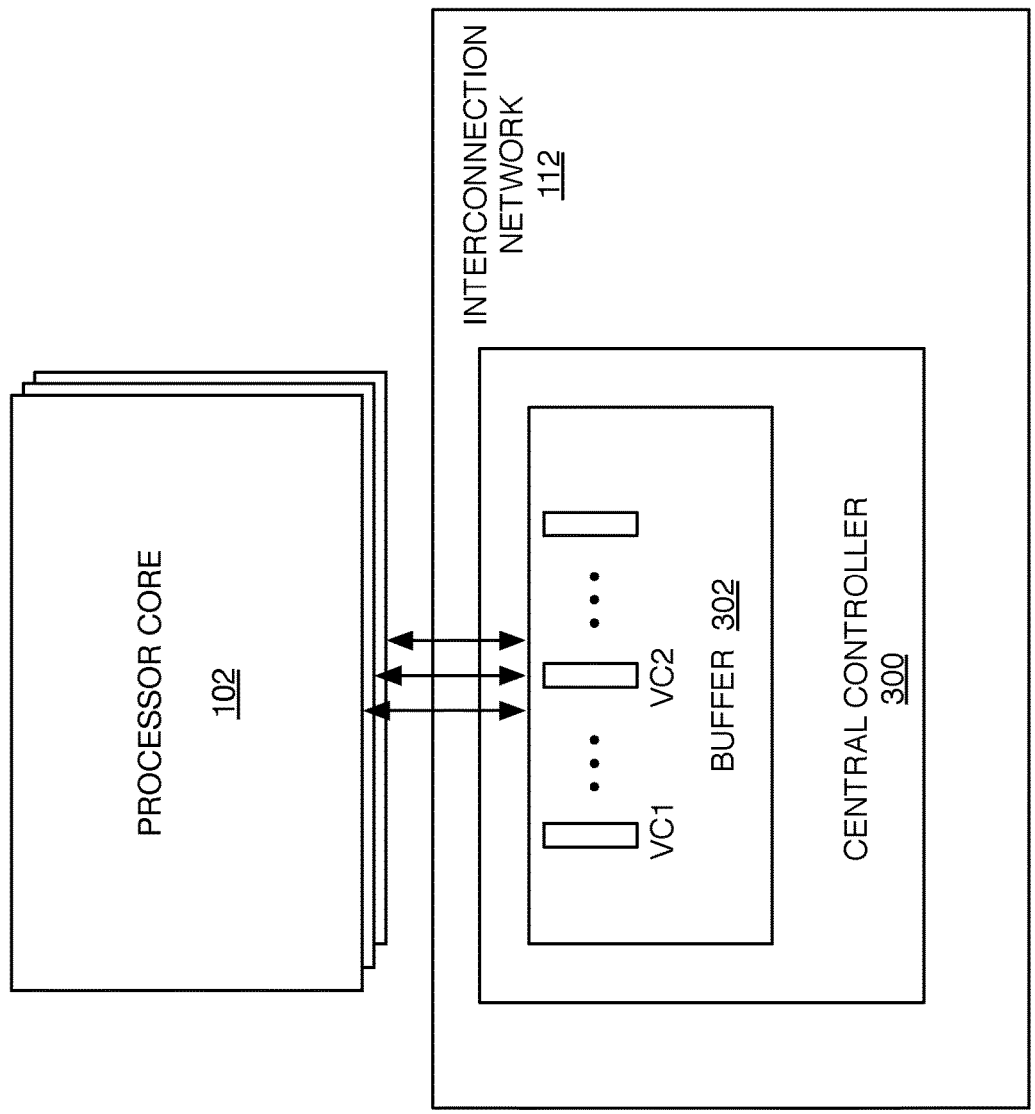
FIG. 3 is a schematic diagram of a central controller in an interconnection network.

For example, referring to FIG. 3, a central controller 300 connected to the circuitry of the interconnection network 112 provides circuitry configured for maintaining shared information and/or handling communication among multiple processor cores related to that shared information. Rather than having devoted circuitry for controlling the LLC 120, and separate devoted circuitry for handling TLBI instruction messages broadcast among processor cores, the central controller 300 is able to function as both an LLC controller and a TLBI controller. Each controller is implemented using a mode of operation of the central controller 300. Avoiding the redundant circuitry that would otherwise be necessary for separate controllers saves valuable chip area devoted to the uncore 110. In other examples, there may be alternative combinations of control functions handled by the central controller 300.

The central controller 300 includes a buffer 302 that is used for temporarily storing information that needs to be sent from one processor to another. For example, in the TLBI controller mode of operation, the buffer 302 stores TLBI instruction messages being broadcast over the interconnection network 112; and in the LLC controller mode of operation, the buffer 302 stores messages containing requests or responses for cache blocks storing instructions or data from an instruction cache or data cache, respectively. Since the different content of the buffer 302 could be received in any order, competition for buffer space could potentially cause operations for accessing cache blocks to be deadlocked due to those cache block messages being stuck behind TLBI instruction messages, or operations associated with TLBI instructions to be deadlocked due to TLBI instruction messages being stuck behind cache block messages. The potential deadlock situation, an example of which is described below, can be avoided by configuring the buffer 302 to use virtual channels, as described in more detail below.

In the following example of a potential deadlock that could arise if the buffer 302 is not configured to use virtual channels, one of the processor cores is assumed to be performing a series of load instructions, at least some of which cause cache blocks to be loaded form the LLC 120 under the control of the central controller 300. The central controller 300 is assumed to be handling a series of TLBI instruction messages that are being broadcast to the processor cores for invalidating a series of addresses. The processor core that is performing the load instructions is also receiving these TLBI instruction messages (e.g., stored in a buffer in the processor core). But, before inserting the TLBI instructions into its pipeline, processor core will first complete all the load instructions that were pending before those TLBI instructions were received. That ordering ensures that any addresses that had not yet finished being loaded by the load instructions will not be invalidated prematurely by the TLBI instructions. In this example, the cache block messages for completing those load instructions are sent to the central controller 300, but the central controller is not able accept them because the buffer 300 is filled with TLBI instruction messages. This situation causes a deadlock, because the TLBI instructions cannot be completed until the load instructions are completed, but the load instructions also cannot be completed until the TLBI instructions are completed (and drained from the buffer 302).

In some implementations, slots in the buffer 302 can be assigned to virtual channels, to ensure that such dependencies are not able to cause deadlock scenarios. For example, a virtual channel VC1 can be assigned a first set of buffer slots, for use by TLBI instructions that are being broadcast via the central controller 300, and a virtual channel VC2 can be assigned to a second set of buffers slots, for use by cache blocks being transferred for memory access instructions. This decoupling ensures that cache blocks and TLBI instructions are not stuck behind each other in the interconnection network 112 due to lack of available buffer space for at least one message of each type, thereby allowing forward progress. The set of assigned buffer slots can be particular slots, or simply a total number of slots from a shared pool of slots. Alternatively, in some implementations, instead of buffer slots, different physical buffers can be assigned to different virtual channels. The virtual channels are called "virtual" because, whether different virtual channels are either assigned different slots in the same physical buffer or in different physical buffers, the different virtual channels all share use of at least some of the same physical communication pathways (e.g., conductor pathways) for propagating signals encoded with the messages being sent between different processor cores, or between processor cores and structures such as the LLC 120.

In addition to circuitry in the interconnection network 112, some implementations may configure other circuitry to use virtual channels to avoid potential deadlock. For example, when TLBIs are broadcast, from a local processor core to remote processor cores, such communication may be handled by an agent in the interconnection network that is in communication with all of the processor cores on the processor chip in a first socket. There may also be other agents that handle communication with processor cores on other processor chips in other sockets. This multi-socket case may also involve communication over physical communication channels between sockets. Such communication channels can be configured to use virtual channels as described above. Also, in addition to broadcast of TLBIs between processor cores of the same or different sockets, there may also be other communication that involves both broadcast messages and acknowledgement messages using virtual channels. For example, after a DSB instruction is issued on a local processor cores, there may be a Global Sync message that is sent to other processor cores, via their agent, and to other sockets, via their agents. The to Global Sync message may ensure for each processor core that all outstanding load and store instructions have completed, and any TLBI instructions have been handled, before responding with an acknowledgement message from that processor core. This may involve stalling the pipeline of the processor core to perform those actions.

Other embodiments are within the scope of the following claims.

What is claimed is:

1. An integrated circuit comprising:
  at least one processor executing instructions in a pipeline, where a plurality of the instructions are high-level instructions associated with a high-level instruction set, and a plurality of the high-level instructions are each converted into multiple low-level instructions associated with a low-level instruction set; and
  control circuitry configured to manage messages associated with memory pages stored in a main memory, wherein the managing includes:
    receiving a message from outside the pipeline, and
    providing at least one low-level instruction to the pipeline for performing an operation indicated by the received message;
  wherein executing instructions in the pipeline includes:
    executing a series of low-level instructions in the pipeline, where the series of low-level instructions includes a first set of low-level instructions converted from a first high-level instruction and a second set of low-level instructions converted from a second high-level instruction, the second high-level instruction occurs after the first high-level instruction within a series of high-level instructions, and the second high-level instruction was pending before the message was received, and delaying insertion of the low-level instruction provided for performing the operation into an insertion position within the series of low-level instructions, where the delaying causes the insertion position to be between a final low-level instruction converted from the first high-level instruction and an initial low-level instruction converted from the second high-level instruction.

2. The integrated circuit of claim 1, wherein the first high-level instruction is an atomic instruction.

3. The integrated circuit of claim 1, wherein at least one low-level instruction in the first set of low-level instructions is associated with a potential side-effect on an architectural state of the processor.

4. The integrated circuit of claim 1, wherein the second high-level instruction occurs immediately after the first high-level instruction within the series of high-level instructions.

5. The integrated circuit of claim 1, wherein the control circuitry is configured to manage:
messages associated with at least one translation lookaside buffer that stores copies of translations between virtual addresses and physical addresses of memory pages stored in the main memory, and
messages associated with at least one cache module that stores copies of memory blocks located on memory pages stored in the main memory.

6. The integrated circuit of claim 5, wherein the integrated circuit comprises a plurality of processors, and the cache module is shared among two or more of the plurality of processors.

7. The integrated circuit of claim 6, wherein the control circuitry is coupled to a message buffer for storing messages to be sent over interconnection circuitry that interconnects the plurality of processors, and the message buffer is used for storing messages for managing the translation lookaside buffer and is used for storing messages for accessing the cache module.

8. The integrated circuit of claim 7, wherein the control circuitry configures the message buffer to provide a plurality of virtual channels that enable messages associated with a first virtual channel from blocking messages associated with a second virtual channel different from the first virtual channel.

9. The integrated circuit of claim 8, wherein the messages associated with the first virtual channel include messages associated with managing the translation lookaside buffer, and the messages associated with the second virtual channel include messages associated with accessing the cache module.

10. The integrated circuit of claim 9, wherein the messages associated with managing the translation lookaside buffer include translation lookaside buffer invalidation messages for invalidating one or more entries in the translation lookaside buffer.

11. A method comprising:
executing instructions in a pipeline of a processor, where a plurality of the instructions are high-level instructions associated with a high-level instruction set, and a plurality of the high-level instructions are each converted into multiple low-level instructions associated with a low-level instruction set; and
managing, using control circuitry, messages associated with memory pages stored in a main memory, wherein the managing includes:
receiving a message from outside the pipeline, and
providing at least one low-level instruction to the pipeline for performing an operation indicated by the received message;
wherein executing instructions in the pipeline includes:
executing a series of low-level instructions in the pipeline, where the series of low-level instructions includes a first set of low-level instructions converted from a first high-level instruction and a second set of low-level instructions converted from a second high-level instruction, the second high-level instruction occurs after the first high-level instruction within a series of high-level instructions, and the second high-level instruction was pending before the message was received, and
delaying insertion of the low-level instruction provided for performing the operation into an insertion position within the series of low-level instructions, where the delaying causes the insertion position to be between a final low-level instruction converted from the first high-level instruction and an initial low-level instruction converted from the second high-level instruction.

12. The method of claim 11, wherein the first high-level instruction is an atomic instruction.

13. The method of claim 11, wherein at least one low-level instruction in the first set of low-level instructions is associated with a potential side-effect on an architectural state of the processor.

14. The method of claim 11, wherein the second high-level instruction occurs immediately after the first high-level instruction within the series of high-level instructions.

15. The method of claim 11, wherein the control circuitry is configured to manage:
messages associated with at least one translation lookaside buffer that stores copies of translations between virtual addresses and physical addresses of memory pages stored in the main memory, and
messages associated with at least one cache module that stores copies of memory blocks located on memory pages stored in the main memory.

16. The method of claim 15, wherein the processor is included in an integrated circuit that comprises a plurality of processors, and the cache module is shared among two or more of the plurality of processors.

17. The method of claim 16, wherein the control circuitry is coupled to a message buffer for storing messages to be sent over interconnection circuitry that interconnects the plurality of processors, and the message buffer is used for storing messages for managing the translation lookaside buffer and is used for storing messages for accessing the cache module.

18. The method of claim 17, wherein the control circuitry configures the message buffer to provide a plurality of virtual channels that enable messages associated with a first virtual channel from blocking messages associated with a second virtual channel different from the first virtual channel.

19. The method of claim 18, wherein the messages associated with the first virtual channel include messages associated with managing the translation lookaside buffer, and the messages associated with the second virtual channel include messages associated with accessing the cache module.

20. The method of claim 19, wherein the messages associated with managing the translation lookaside buffer include translation lookaside buffer invalidation messages for invalidating one or more entries in the translation lookaside buffer.

21. The integrated circuit of claim 2, wherein the atomic instruction is associated with a plurality of steps performed by different low-level instructions into which the atomic instruction is converted, and at least one of the steps includes accessing an address that is potentially accessible by the low-level instruction provided for performing the operation.

22. The method of claim 12, wherein the atomic instruction is associated with a plurality of steps performed by different low-level instructions into which the atomic instruction is converted, and at least one of the steps includes accessing an address that is potentially accessible by the low-level instruction provided for performing the operation.

23. The integrated circuit of claim 1, wherein, before the message was received, at least one of the second set of low-level instructions converted from the second-high level instruction was in a buffer of decoded instructions being stored until they are ready to be issued.

24. The method of claim 11, wherein, before the message was received, at least one of the second set of low-level instructions converted from the second-high level instruction was in a buffer of decoded instructions being stored until they are ready to be issued.

\* \* \* \* \*